(12) United States Patent
Dorney

(10) Patent No.: US 8,127,805 B2
(45) Date of Patent: *Mar. 6, 2012

(54) BEVERAGE DISPENSING SYSTEM

(75) Inventor: Peter Dorney, Winter Springs, FL (US)

(73) Assignee: ValidFill LLC, Sarasota, FL (US)

( * ) Notice: Subject to any disclaimer, the term of this patent is extended or adjusted under 35 U.S.C. 154(b) by 57 days.

This patent is subject to a terminal disclaimer.

(21) Appl. No.: 12/618,345

(22) Filed: Nov. 13, 2009

(65) Prior Publication Data

US 2010/0147417 A1 Jun. 17, 2010

Related U.S. Application Data

(62) Division of application No. 10/922,470, filed on Aug. 20, 2004, now Pat. No. 7,617,850.

(51) Int. Cl.
*B65B 3/04* (2006.01)

(52) U.S. Cl. ............ 141/104; 141/94; 141/351; 222/23; 222/129.1; 222/640

(58) Field of Classification Search .................... 141/94, 141/104, 351; 222/23, 129.1, 640
See application file for complete search history.

(56) References Cited

U.S. PATENT DOCUMENTS

| | | | |
|---|---|---|---|
| 5,566,732 A | 10/1996 | Nelson | |
| 6,443,335 B1 | 9/2002 | Pinedjian et al. | |
| 6,968,876 B2 | 11/2005 | Yacko et al. | |
| 7,127,236 B2 | 10/2006 | Khan et al. | |
| 7,617,850 B1 * | 11/2009 | Dorney | 141/94 |
| 7,845,375 B2 * | 12/2010 | Dorney | 141/94 |
| 2002/0134831 A1 | 9/2002 | Saveliev et al. | |
| 2003/0051767 A1 | 3/2003 | Coccaro et al. | |
| 2004/0093281 A1 | 5/2004 | Silverstein et al. | |
| 2004/0220824 A1 | 11/2004 | Imai et al. | |
| 2005/0029287 A1 | 2/2005 | Mobbs | |
| 2005/0087255 A1 | 4/2005 | Humphrey et al. | |
| 2005/0140501 A1 | 6/2005 | Rizzo et al. | |
| 2006/0219776 A1 | 10/2006 | Finn | |

* cited by examiner

*Primary Examiner* — Gregory L Huson
*Assistant Examiner* — Nicolas A Arnett
(74) *Attorney, Agent, or Firm* — Buchanan Ingersoll & Rooney PC

(57) ABSTRACT

A beverage dispensing system has a container with an upper lip, a bottom and a cylindrical sidewall. A read/write radio frequency identification tag is on a container. A beverage dispenser has a plurality of dispensing valves associated with a plurality of different beverages. Each valve has an actuator. A reader is operatively coupled with respect to the tag for communicating with the tag and for communicating with the actuator. An electronic system is operatively coupled to the tag and the actuators and the reader.

15 Claims, 4 Drawing Sheets

BEVERAGE DISPENSING SYSTEM

BACKGROUND OF THE INVENTION

1. Field of the Invention

The present invention relates to a beverage dispensing system and more particularly pertains to controlling and supervising the billing, inventorying and pouring of drinks.

2. Description of the Prior Art

The use of beverage dispensing systems of known designs and configurations is known in the prior art. More specifically, beverage dispensing systems of known designs and configurations' previously devised and utilized for the purpose of dispensing drinks are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,872,110 issued Aug. 16, 1932 to Brand discloses a dispensing apparatus. U.S. Pat. No. 4,415,065 issued Aug. 16, 1932 to Sandstedt discloses a restaurant or retail vending facility. U.S. Pat. No. 6,102,162 issued Aug. 15, 2000 to Teicher discloses an automated self-service cafeteria system.

While these devices fulfill their respective, particular objectives and requirements, the aforementioned patents do not describe beverage dispensing system that allows controlling and supervising the billing, inventorying and pouring of drinks.

In this respect, the beverage dispensing system according to the present invention substantially departs from the conventional concepts and designs of the prior art, and in doing so provides an apparatus primarily developed for the purpose of controlling and supervising the billing, inventorying and pouring of drinks.

Therefore, it can be appreciated that there exists a continuing need for a new and improved beverage dispensing system which can be used for controlling and supervising the billing, inventorying and pouring of drinks. In this regard, the present invention substantially fulfills this need.

SUMMARY OF THE INVENTION

In view of the foregoing disadvantages inherent in the known types of beverage dispensing systems of known designs and configurations now present in the prior art, the present invention provides an improved beverage dispensing system. As such, the general purpose of the present invention, which will be described subsequently in greater detail, is to provide a new and improved beverage dispensing system and method which has all the advantages of the prior art and none of the disadvantages.

To attain this, the present invention essentially comprises a cup. The cup has a generally cylindrical configuration with an inner wall and an outer wall defining an intermediate air space. The cup further has an upper lip and a bottom. The cup has a cylindrical sidewall between the upper lip and the bottom.

Next provided is an ISO 15693 certified read/write 13.56 MHz RFID, hereinafter radio frequency identification, tag on the container. The tag is passive in the preferred embodiment. In an alternate embodiment it is active. It is adapted to store information relating to a purchase situated on the sidewall of the cup in the preferred embodiment. In an alternate embodiment, it is on the bottom of the cup. The tag is adapted to store information relating to purchase time and purchase date and related to the size of the cup and amount being purchase.

Next, a self serve beverage dispenser is provided. The beverage dispenser has a plurality of dispensing valves associated with a plurality of different beverages. Each valve also has an actuator formed as a proximity sensor adapted to notify the CPU that a cup is under a specific dispensing head and to notify the reader, the antenna, to read the information on the RFID tag.

A single reader, antenna, is next provided. The reader is located in a vertical plane in the proximity of the dispenser beneath the valves. The reader is operatively coupled with respect to the tag for communicating with the tag and for communicating with the actuator.

Next, an electronic system is provided. The electronic system is operatively coupled to the tag and the actuators and the reader. The electronic system includes a central processing unit (CPU), and an antenna and the tag with the actuator coupled to the cup and the CPU and has a relay coupled to the valves and the ice dispenser.

The electronic system also includes an input/output (I/O) board and a host controlled board. The I/O board includes an off/on switch and a power providing transformer and a rectifier and two regulators. The electronic system also includes an RFID reader board and an Optical Radio Modem inputting the I/O board. The host controller board includes a Realtime Clock, a Flash, an I/O, a SRAM, a CPU and timers.

The ISO 15693 Tag Format for RFID MUG PRODUCTS is a 64 block sub system with Block 1 being a MAGICNUMBER: 32 bits, Block 2 being a VERSIONID: 32 bits, Block 3 being a STARTDATE TIME: 32 bits, Block 4 being a STOPDATE TIME: 32 bits, Block 5 being a VENDORID: 32 bits, Block 6 being a LOCATIONID: 32 bits, Block 7 through Block 64 being SPARE: 32 bits. All of the blocks are preferably hard coded ID: 64 bits.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved beverage dispensing system which has all of the advantages of the prior art beverage dispensing systems of known designs and configurations and none of the disadvantages.

It is another object of the present invention to provide a new and improved beverage dispensing system which may be easily and efficiently manufactured and marketed.

It is further object of the present invention to provide a new and improved beverage dispensing system which is of durable and reliable constructions.

An even further object of the present invention is to provide a new and improved beverage dispensing system which is susceptible of a low cost of manufacture with regard to both materials and labor, and which accordingly is then susceptible of low prices of sale to the consuming public, thereby making such beverage dispensing system economically available to the buying public.

Even still another object of the present invention is to provide a beverage dispensing system for controlling and supervising the billing, inventorying and pouring of drinks.

Lastly, it is an object of the present invention to provide a new and improved A beverage dispensing system has a container with an upper lip, a bottom and a cylindrical sidewall. A read/write radio frequency identification tag is on a container. A beverage dispenser has a plurality of dispensing valves associated with a plurality of different beverages. Each valve has an actuator. A reader is operatively coupled with respect to the tag for communicating with the tag and for communicating with the CPU, which communicates with the actuators for beverage and ice. An electronic system is operatively coupled to the tag and the actuators and the reader.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
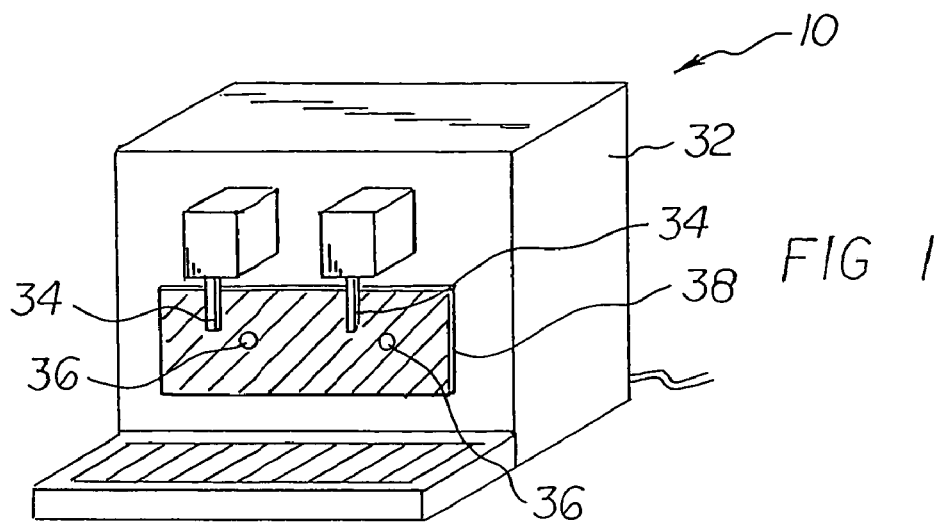
FIG. 1 is a perspective illustration of a RFID dispensing system constructed in accordance with the principles of the present invention.
Figure 2:
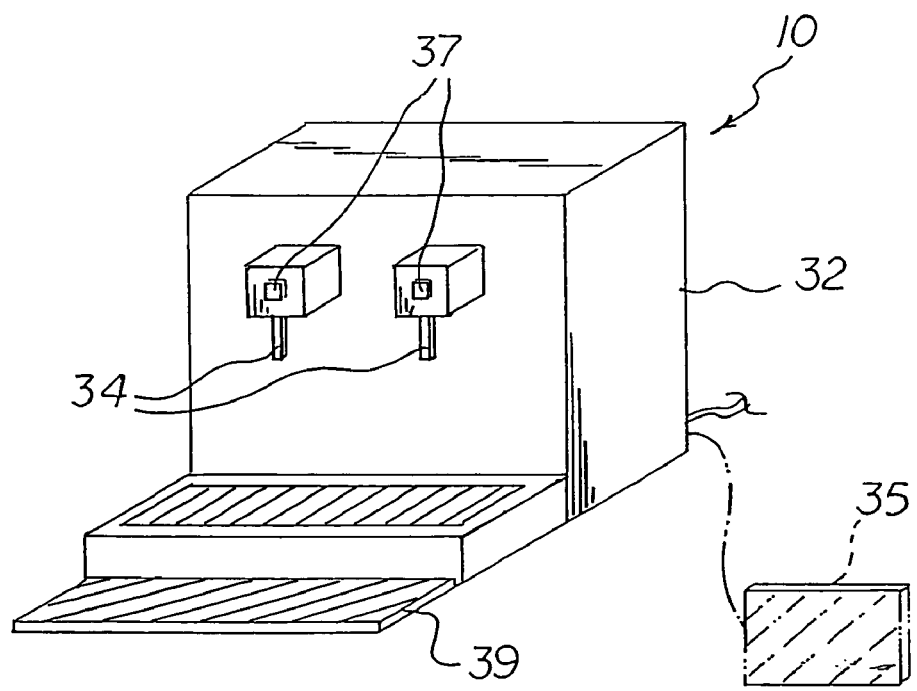
FIG. 2 is a perspective illustration of a RFID dispensing system constructed in accordance with an alternate embodiment of the invention.

With reference now to the drawings, and in particular to FIG. 1 thereof, the preferred embodiment of the new and improved beverage dispensing system embodying the principles and concepts of the present invention and generally designated by the reference numeral 10 will be described.

The present invention, the beverage dispensing system 10 is comprised of a plurality of components. Such components in their broadest context include a container, a read/write radio frequency identification tag on a container, a beverage dispenser, a reader, an electronic system and an antenna for sending the information to the RFID tag. Such components are individually configured and correlated with respect to each other so as to attain the desired objective.

First provided is a cup 14. The cup has a generally cylindrical configuration with an inner wall 16 and an outer wall 18 defining an intermediate air space. The cup further has an upper lip 20 and a bottom 22. The cup has a cylindrical sidewall 24 between the upper lip and the bottom. The cup may be any other type of container such as a glass, paper, bottle or ice bucket as for ice.

Figure 3:
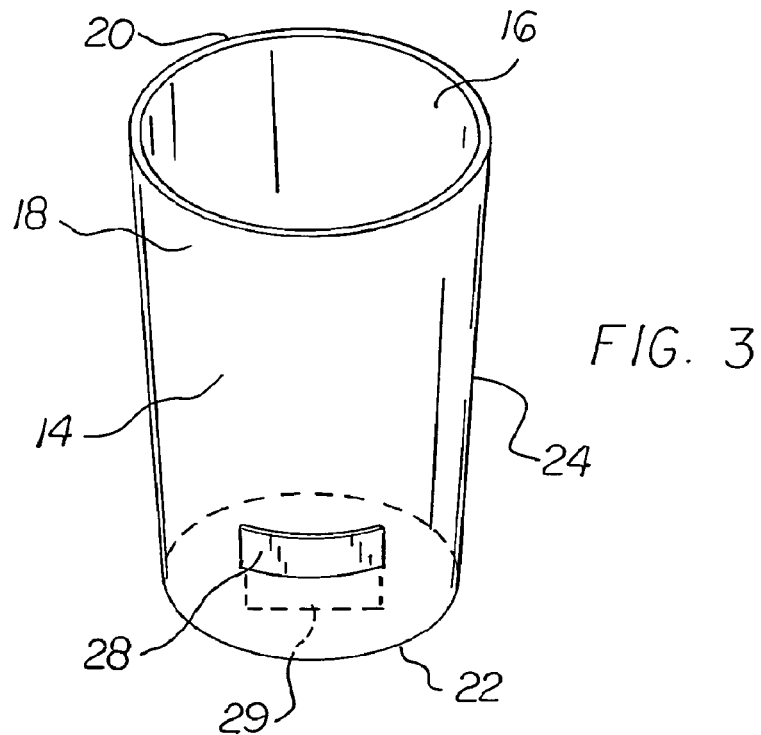
FIG. 3 is a perspective illustration of a cup for receiving fluids or other material dispensed from the system shown in FIGS. 1 and 2.
Figure 4:
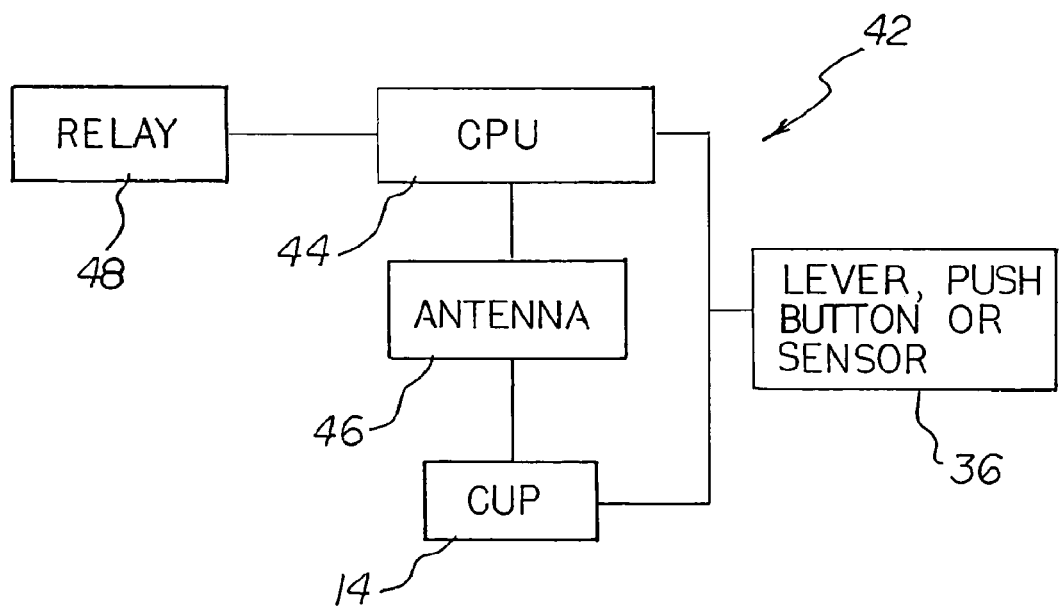
FIG. 4 is a block diagram of the circuitry employed in the dispensing system of FIGS. 1 and 2.

Next provided is an ISO 15693 certified read/write 13.56 MHz RFID, hereinafter radio frequency identification, tag 28 on the container. The tag is passive and is adapted to store information relating to a purchase situated on the sidewall of the cup. The tag is adapted to store information relating to purchase time and purchase date and related to the size of the cup and amount being purchase. In an alternate embodiment of the invention, the tag 29 is placed on the bottom of the cup. Note the dotted line showing of FIG. 3.

Next, a self serve beverage dispenser 32 is provided. The beverage dispenser has a plurality of dispensing valves 34 associated with a plurality of different beverages. The dispenser is intended to dispense beverages in the primary embodiment. Such beverages may be hot or cold and may also be ice. Each valve also has an actuator formed as a proximity sensor 36 adapted to read information in the tag on the cup. In an alternate embodiment of the invention, the proximity sensor 36 is replaced by a button 37 for each valve to initiate dispensing. The CPU is inside the dispensing unit.

A reader 38 is next provided. The reader is located in a vertical plane in the proximity of the dispenser beneath the valves. The reader is operatively coupled with respect to the tag for communicating with the tag and for communicating with the CPU which communicates with the actuator. In an alternate embodiment of the invention, a modified reader 39 is in a horizontal plane in front of and beneath the dispenser. Such antenna is a read/write antenna which will give the RFID system the ability to send information back to the RFID tag in the cup to be stored for various promotions, as for example buy 10 drinks and get 5 drinks for free, or for a debit/credit transaction on prepaid cup promotions. Another alternate embodiment includes a supplemental antenna 35 which is a separate smaller antenna, a read only, antenna in one embodiment and a read/write antenna in another alternate embodiment. It is located on one side of the unit. The reason for this is if some customer wants to use only RFID cards and not RFID tags in cups, then they will have the ability to use an existing RFID card with a beverage dispensing system. The existing RFID cards are debit/credit cards that are currently being used in the market.

Next, an electronic system 42 is provided. The electronic system is operatively coupled to the tag and the actuators and the reader. The electronic system includes a central processing unit 44 (CPU), and an antenna 46 and the tag with the actuator coupled to the cup and the CPU and has a relay 48 coupled to the valves.

Figure 5:
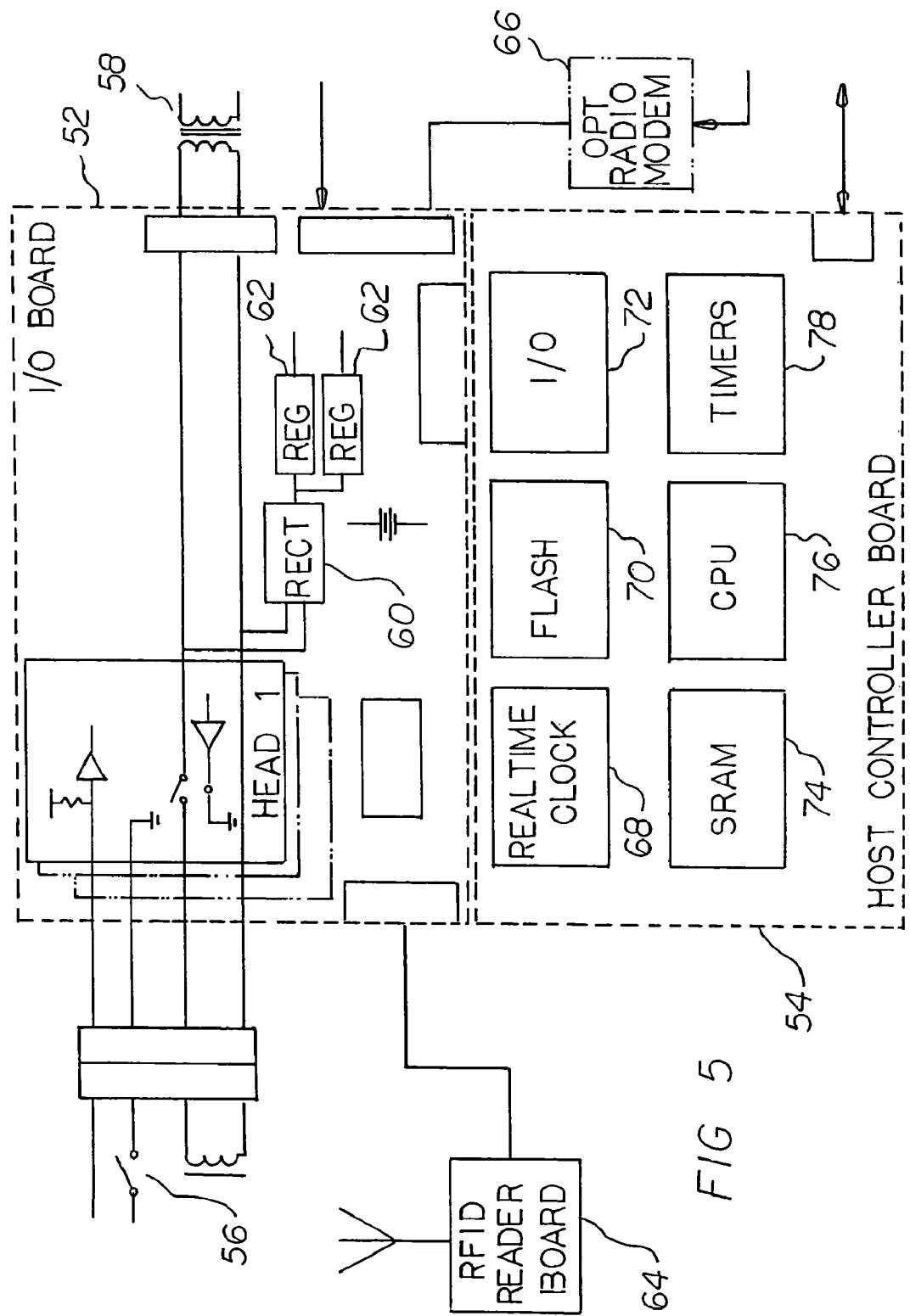
FIG. 5 is a circuit diagram of the system of the prior Figures including the I/O board and host controller board as well as inputs and outputs.
Figure 6:
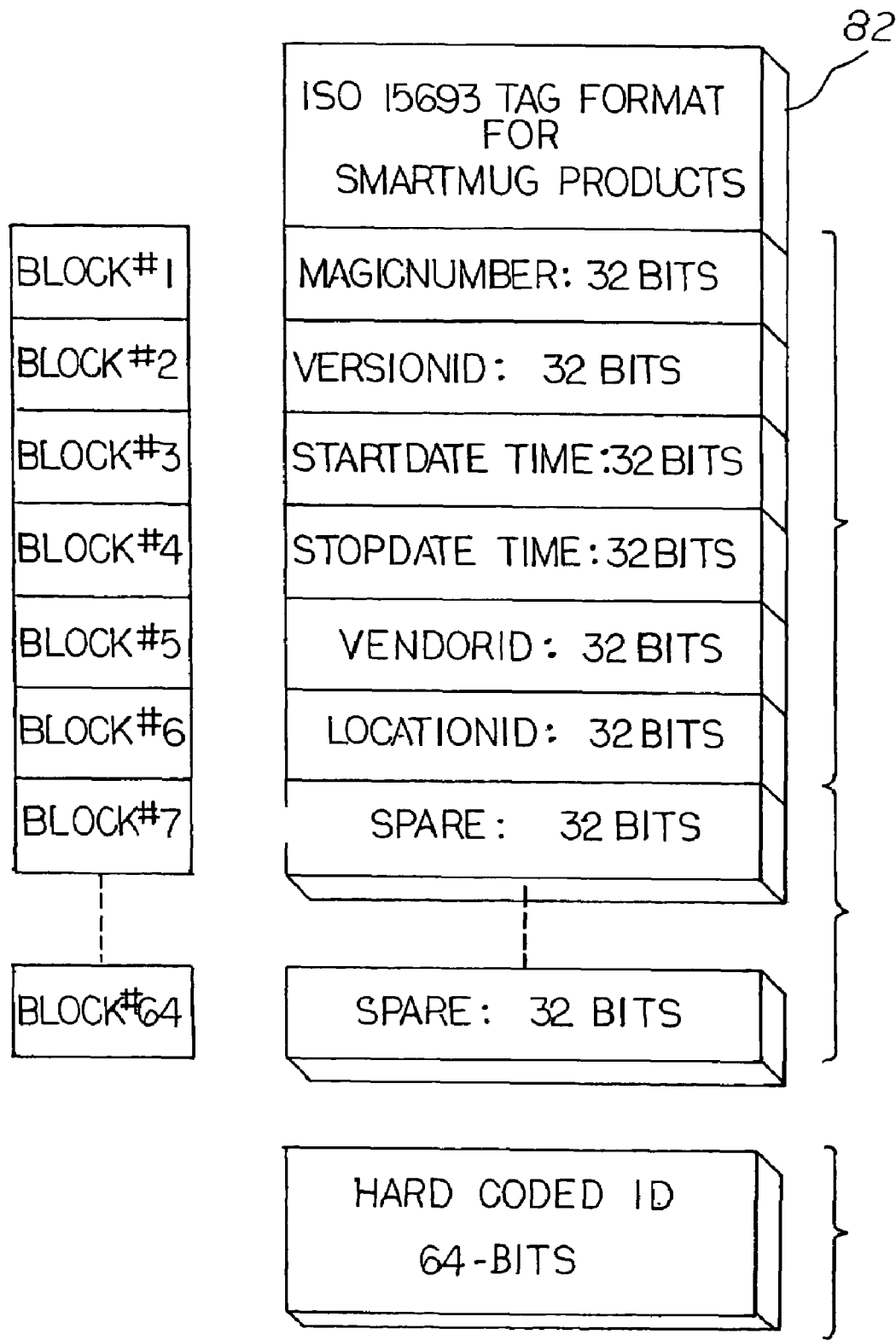
FIG. 6 is a block diagram of the ISO 15693 Tag Format for the RFID MUG Products.

The electronic system also includes an input/output (I/O) board 52 and a host controlled board 54. Note FIG. 5 which is a block diagram of the RFID beverage dispenser circuitry. The I/O board includes an off/on switch 56 and a power providing transformer 58 and a rectifier 60 and two regulators 62. The electronic system also includes an RFID reader board 64 and an Optical Radio Modem 66 inputting the I/O board. The host controller board includes a Realtime Clock 68, a Flash 70, an I/O 72, a SRAM 74, a CPU 76 and timers 78.

The ISO 15693 Tag Format for SMARTMUG PRODUCTS is a 64 block sub system 82. The first six blocks are required information with the remaining blocks for future expansion and with the final 64 bit block used to identify multiple tags and with Block 1 being a MAGICNUMBER: 32 bits, Block 2 being a VERSIONID: 32 bits, Block 3 being a STARTDATE TIME: 32 bits, Block 4 being a STOPDATE TIME: 32 bits, Block 5 being a VENDORID: 32 bits, Block 6 being a LOCATIONID: 32 bits, Block 7 through Block 64 being SPARE: 32 bits. All of the blocks are preferably hard coded ID: 64 bits.

The invention uses off the shelf ISO certified RFID readers, antennas and chips to create a software driven system that can be manipulated to create self serve refill cup programs, track inventory of fountain beverage, ice, and cup inventory.

The beverage system helps 1) control beverage theft with containers not associated with the current program (competitors' cups); 2) calculate the exact amount of ounces and the brand being poured into each cup (time based/ounces per second: flow rate) to allow the customer to determine the average ounces poured per cup per program (price validation); 3) JIT inventory can be achieved; and 4) the system can determine where the cups were purchased. This will help operators bill offsite locations for the beverages poured at their locations. For example, a location receives the money for the free refill mug, but the visitor goes to a different location and pours the beverage. The offsite operator has the expense of the beverage but receives no money for the sale.

The present invention is a software and hardware driven system that uses off the shelf ISO RFID products to avoid issues with quality and inconsistent industry standards.

The present invention will use the ISO 15693 certified read/write 13.56 MHz RFID tag that will work perfectly for this application because it has the ability to read through water, human tissue and plastic. These ISO certified (15693) tags are individually numbered giving the system the ability to individually track each cup in the system. The tags also have anti-collision identification protocols within the ISO 15693 readers allowing multiple transponder or tags to be read simultaneously. Our tags will be passive tags, so the tags will not have a battery source, giving the tag a very long shelf-life. The RFID tag is powered up by the RFID antenna (write portion) at the register and by RFID antenna (read portion) at the dispensing system. Active tags which use a battery source are included.

The RFID antenna (write portion) at the cash register will send information (location, promotion code, date, etc.) to the RFID tag in the bottom of the cup.

After the cup is purchased, the consumer will go to the dispensing system to receive a beverage. The present invention has a single antenna, read station, that spans across the length of the dispensing heads. The antenna can be placed in two locations, on the back panel above the drip pan or in front of the drip pan. If multiple heads are used, one at each head, the RFID dispensing unit will have problems reading a cup because the multiple wave patterns, multiple antennas, will interfered with each other and cause a void area where the wave patterns overlap one another. There is a large percentage of overlap with a multiple head hardware setup which creates many inconsistent reads. This flaw can be overcome by using one antenna that stretches across the entire back of the unit. This alleviates the inconsistent reads, but it creates another flaw. The antenna is constantly looking for an RFID tag in the reading field. Once the antenna finds a valid RFID tag it will open all of the heads so a beverage can be dispensed. The reason this has to happen is the system cannot tell which dispensing head the cup is under, so it has to open all of the heads Once a head is activated, the other heads will shut down. The problem with this scenario is if multiple people are pouring at the same time you will not be able to tell which brand is being poured into an ISO RFID tag numbered cup. If you cannot identify each cup individually, each ISO tag has it own number, a lot of the data will not have any true value. This can be fixed in three ways:

1) The antenna will not read into the reading field to validate a cup until after a lever or push button (on/off switch) is depressed. This will notify the dispensing machine to read the field for information.

2) The antenna will not read into the reading field to validate a cup until after an infrared proximity sensor(s) sees that a cup is under the dispensing head. The sensor will notify the dispensing machine to read the field for information.

3) The antenna will constantly be reading. As a cup goes into the reading field it will be time stamped by the Host Controller Board/PCB. As multiple cups go into the field each cup will be time stamped and read for information individually. The first cup that touches a lever has the flow button pushed or is read by the infrared proximity sensor will be "classified" as the first cup into the reading field, and will be matched up with the information received form the cup (RFID tag) that was time stamped first.

Problems occur if a consumer changes his/her mind on a brand during pouring. The only way to fix this scenario is to calculate the ounces of a beverage being poured into each cup using time based flow rate calculations. This is impossible if you do not know which cup the ounces are being poured into because of the inability to locate the cup. The three solutions enumerated above will tell the dispensing machine where the cups are in the reading field.

As a result of using the infrared proximity sensors to detect where the cup is located, the present invention has another major benefit over dispensing systems of known designs and configurations. A lever or a push button features is eliminated which will save on wear and tear of the unit as there are no moving parts. The present invention will also help with sanitary issues as it will be easier to clean.

The Host Controller Board (PCB) will provide the overall operation and data storage at the dispensing system. The information can be sent via cellular Ethernet (internet) or manual collection at the system. The information can then be downloaded into a main computer as for predetermined calculations.

The antenna at the dispensing system will be attached as follows. The antenna will be retrofitted to the stainless steel panel on the unit. The RFID antenna will plug into a harness that connects to a small simple computer (flash memory, real time clock, battery backed SRAM, small CPU). The small computer (Host Controller Board/PCB) will have another harness that has a relay switch for every dispensing head. This relay switch (harness) will piggyback to each dispensing head. This is a very simple electronic gate. This piggy backed switch will always be open so that the head will be inactive and inoperable until the gate is closed. The harness that goes to the dispensing heads will also be used, if infrared proximity sensors are not being used, to notify the dispensing system that a cup is under a certain head. If an infrared proximity sensor is used to determine if a cup is under a dispensing head, a separate harness will be used. The harness will go from the Host Controller Board/PCB to the infrared proximity sensors located on the antenna or dispensing machine.

Following is the flow of a cup:
a) A cup is purchased and information is sent to the RFID tag using the Write antenna at the register;
b) The cup is placed under the dispensing head and its position is located by an infrared proximity sensor, lever or On/Off push button on the dispensing head;

c) The Read Antenna will read the information on the Cups RFID tag after the antenna is notified to do so (steps 1 & 2 above). Or, the antenna will constantly be reading the information on the cups RFID Tags(s) so the cup(s) can be time stamped and the information from the RFID tag can be stored (3 above). The collected information from all scenarios will be used to verify the cups validity.

e) If the cup is valid, a signal is sent through another harness, from the Host Controller Board/PCB to the dispensing head. This harness has a relay switch that is piggy backed on the dispensing head. The valid signal will close the relay switch gate allowing the beverage to pour.

f) The head will stop pouring after the cup is removed away from the proximity sensor, the pour lever is released, the on/off push button is released or the allotted ounce capacity for the cup has been reached.

The system is completely software driven so that promotions are endless. For example, to truly increase more frequent visits at a store with a cup refill program you have to create loyalty. A way to achieve this is to give cups (people) reward points for using their cups at the store chain. The more times people pour at a certain store chain, the more reward points they receive. Another example is that you purchase 10 cups and get 5 for free. The customer does not have to worry about a ticket, and the store can actually see true numbers for the number of pours a person actually pours for this type of promotion.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method for dispensing a beverage from a dispenser having a plurality of dispensing valves, each valve of said plurality of dispensing valves being associated with at least one actuator and at least one beverage, said method comprising:
    locating a container having a read/write radio frequency identification tag coupled thereto by engaging an actuator associated with one of the dispensing valves;
    activating an RF device that is capable of reading and writing information to and from said tag, said information including user data and purchase information wherein said RF device is activated when the actuator is activated;
    reading said user data and purchase information from said tag;
    interpreting said user data and purchase information received by said RF device from said tag;
    opening one or more dispensing valves in response to said user data and purchase information;
    commencing the dispensing of a selected beverage; and
    writing updated user data and purchase information onto said tag.

2. The method of claim 1, wherein said actuator is a proximity sensor.

3. The method of claim 2, comprising activating said RF device to read when the proximity sensor senses a cup in the proximity of at least one dispensing valve.

4. The method of claim 1, wherein said actuator is selected from the group consisting of a lever and a button.

5. The method of claim 1, wherein said updated user information and purchase information including quantity of beverage dispensed from the valve under which the container was located.

6. A beverage dispensing system comprising:
    a container;
    a read/write radio frequency identification tag coupled to the container;
    a plurality of dispensing valves;
    a plurality of actuators, each corresponding to at least one valve of said plurality of valves, each actuator being adapted to commence the dispensing of a beverage through said valve;
    an RF device capable of reading and writing information to and from said tag, said RF device being activated to read and write information to and from said tag when one of said plurality of actuators is engaged; and
    an electronic system operatively coupled to said at least one dispensing valve and said RF device for interpreting information received by said RF device from said tag and for opening one or more of said plurality of dispensing valves in response to said information, said electronic system being configured to enable said RF device to read and write information to each one of a plurality of tags by locating the position of each tag and by associating each tag with a particular actuator that has been activated by a user.

7. The beverage dispensing system of claim 6, wherein said RF device is an RFID tag.

8. The beverage dispensing system of claim 7, wherein said RF device is an ISO 15693 certified read/write 13.56 MHz RFID tag.

9. The beverage dispensing system of claim 6, wherein said information is selected from the group consisting of user data and purchase information.

10. The beverage dispensing system of claim 6, wherein said plurality of actuators are proximity sensors.

11. The beverage dispensing system of claim 6, wherein each of said plurality of actuators is selected from the group consisting of a lever and a button.

12. The beverage dispensing system of claim 6, comprising a supplemental read/write antenna for communicating with an RFID tag and for communicating with each of said plurality of actuators.

13. The beverage dispensing system of claim 6, comprising a plurality of dispensing heads.

14. The beverage dispensing system of claim 13, wherein each of said plurality of dispensing heads corresponds to a dispensing valve.

15. The beverage dispensing system of claim 13, wherein each of said plurality of dispensing heads corresponds to an actuator.

* * * * *